Dec. 5, 1961 D. MORROW 3,011,737
AERIAL DROGUES
Filed Feb. 3, 1958 4 Sheets-Sheet 1
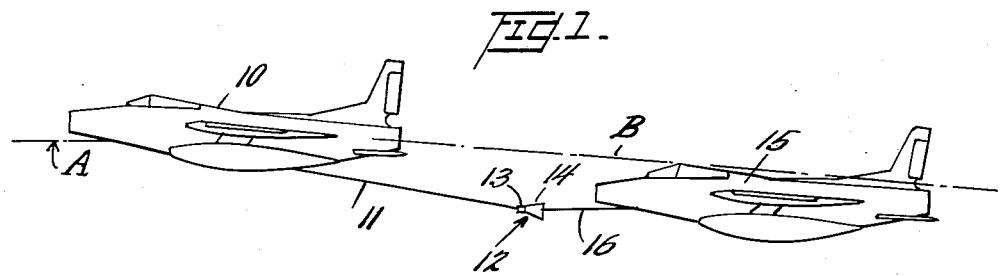
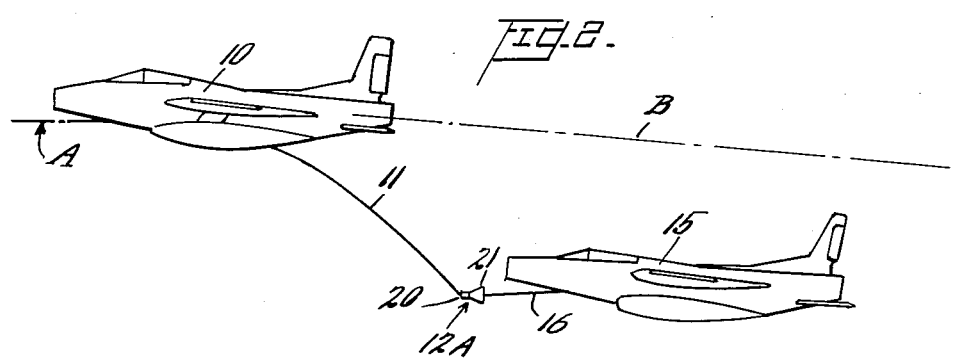
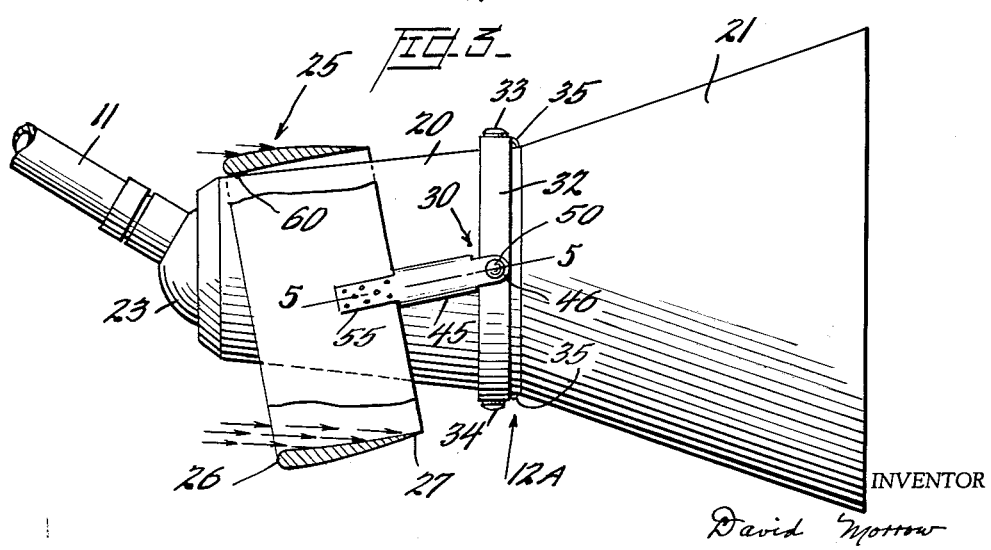
INVENTOR
David Morrow
BY Watson, Cole, Grindle & Watson
ATTORNEYS Dec. 5, 1961 — D. MORROW — 3,011,737
AERIAL DROGUES
Filed Feb. 3, 1958 — 4 Sheets-Sheet 2
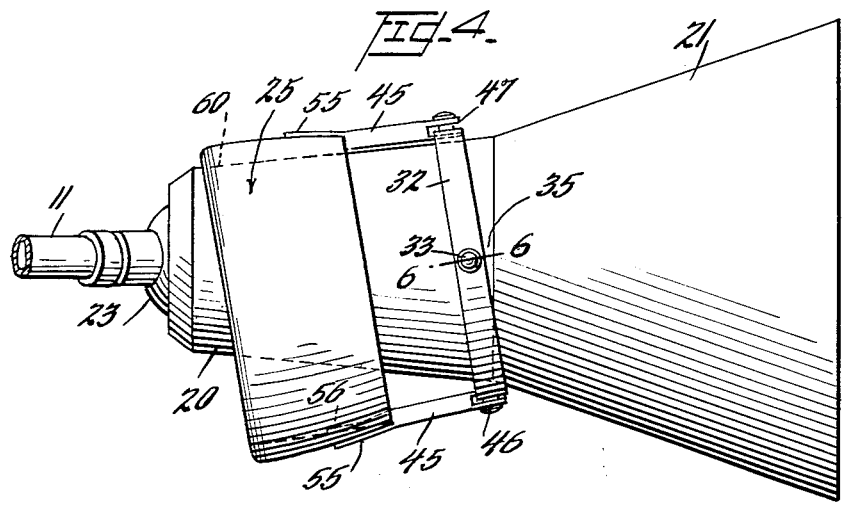
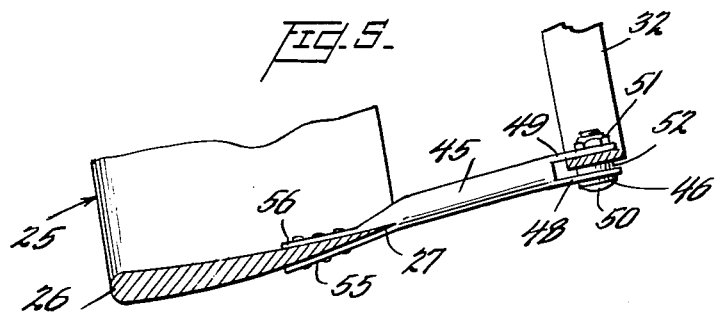
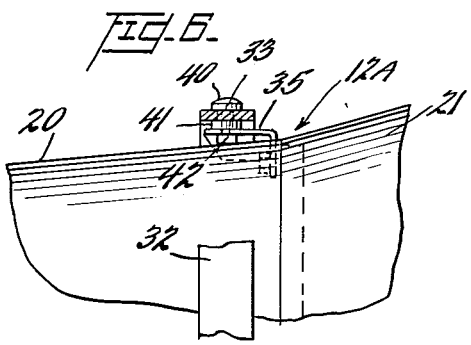
INVENTOR
David Morrow
BY Watson, Cole, Grindle & Watson
ATTORNEYS

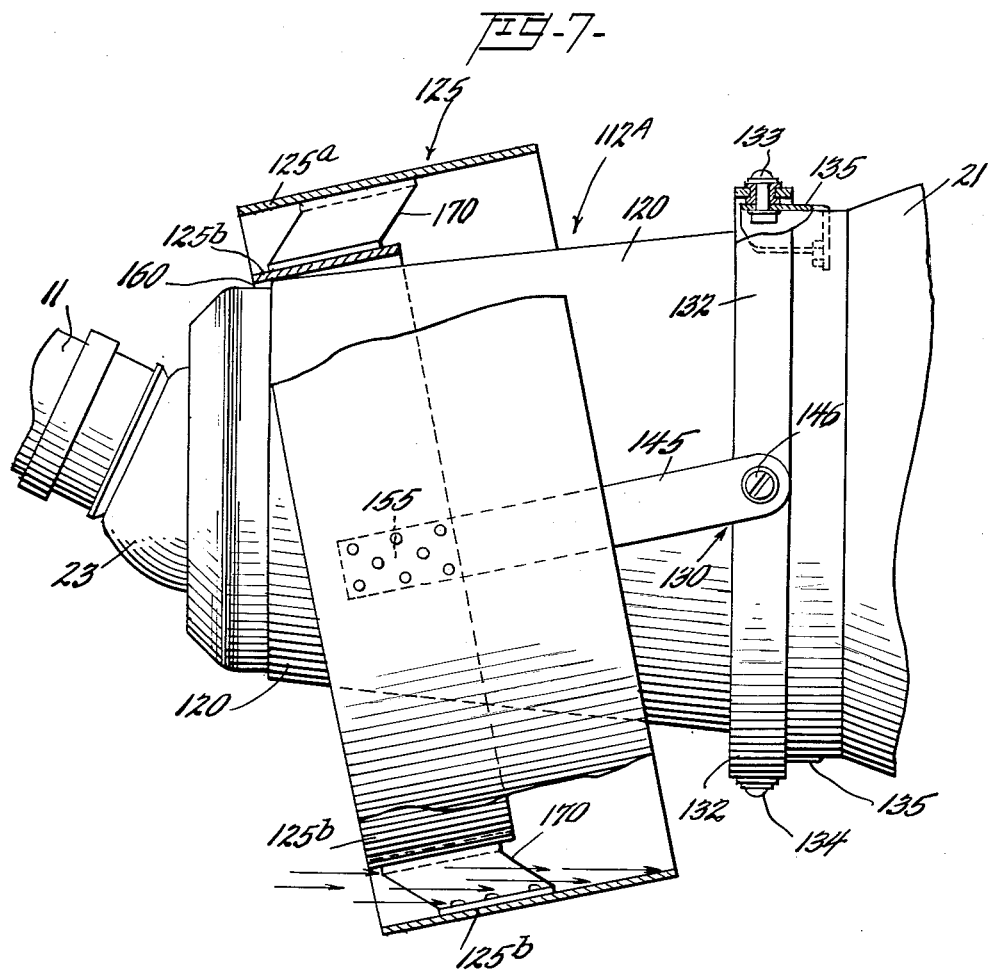
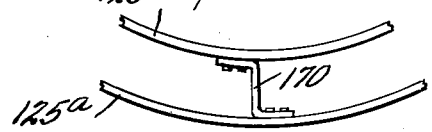

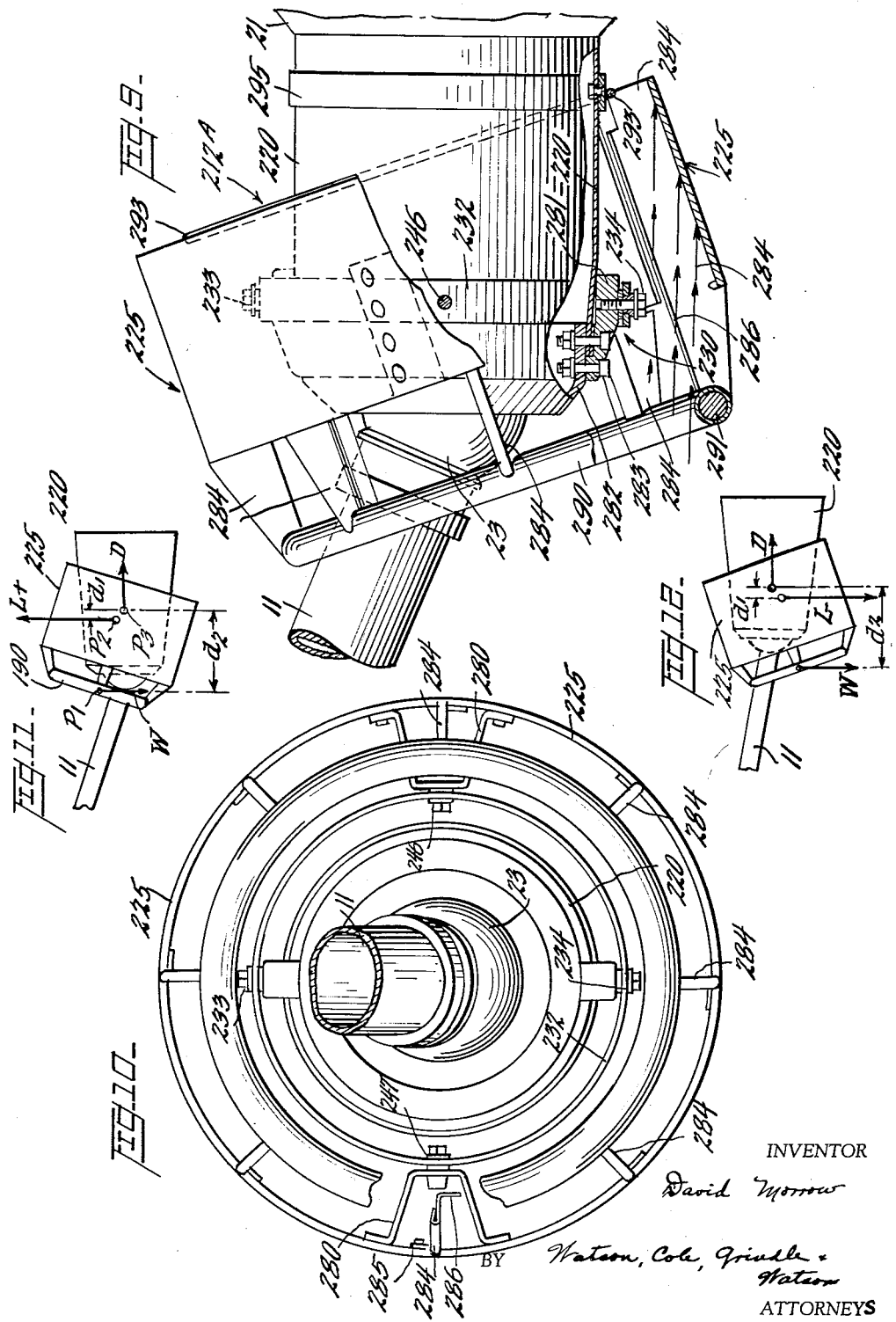

United States Patent Office 3,011,737
Patented Dec. 5, 1961

3,011,737
AERIAL DROGUES
David Morrow, Silver Spring, Md., assignor to Flight Refueling Incorporated, Baltimore, Md., a corporation of Delaware
Filed Feb. 3, 1958, Ser. No. 712,720
27 Claims. (Cl. 244—3)

This invention relates to aerial drogues and more particularly to these instrumentalities as adapted for stabilizing the flight of an object secured to the end of a line trailed from an aircraft.

The general objects of the invention are the provision, in association with such trailed elements, of a novel and improved drogue device, incorporating therein a depressor member for introducing a negative lift force upon the element when it is trailed in the air stream, and also the provision of such a depressor member as an attachment for a drogue or other trailed object.

Certain systems of refueling aircraft in flight which have been the subjects of development by the applicant's assignee, have been characterized by the trailing of a fuel hose from a leading aircraft, the hose being provided at its trailing end with a liquid conduit coupling member which is adapted to be contacted by and engaged with a mating coupling member carried by and preferably protruding forwardly from the following aircraft.

In order to give the trailing hose and coupling member sufficient drag to trail in a position having only a slight angularity to the horizontal, so that the following aircraft will have no difficulty in presenting the mating coupling member to the trailed coupling member by closing on the leading aircraft, a drogue member has been attached to or made a part of the trailed coupling member. This drogue member has usually taken the form of a rearwardly flaring conical funnel-like element, which not only accomplishes that stated purpose but also furnishes a guide for leading the probing mating coupling member into registry and ultimate engagement with the trailed coupling member.

It has been found desirable that refueling contact be made between the two aircraft with the following aircraft taking station out of the wake or back-wash of the leading plane, and in refueling jet aircraft it is a positive necessity that this condition prevail.

This requires an increase in the trail angle between the hose and the axis of the leading aircraft from which it trails, and this purpose is readily attained by means of the depressor device provided by the present invention. This depression of the hose and its trailed coupling member also permits the following aircraft to approach the leading aircraft much closer before making contact, which greatly decreases the length and weight of the hose required for the refueling operation.

Another benefit derived from the use of the novel depressor feature is the increased stabilization of the drogue device by creating the downward or minus lift force which acts in conjunction with the aft force of the back-wash to supply the stabilizing force.

In its preferred embodiment, the invention contemplates the provision of a drogue and coupling assembly which retains the conventional flaring conical drogue element but applies to the assembly at a selected point thereon a universally mounted generally cylindrical annulus, the walls of which are preferably of aerodynamic air-foil cross-section. This depressor ring or annulus is preferably gimbal mounted either at a point aft of its effective cylindrical air foil body or at a point within the confines of said substantially cylindrical body. In flight, the cylindrical annulus is disposed in a position wherein the axis of the cylinder is inclined downwardly in the forward direction, so that both the outer surface of the upper half of the cylinder and the inner surface of the lower half present air foil surfaces to the air flow with a negative angle of attack, and this position is continually maintained in spite of any rotative movement experienced by the drogue and coupling assembly, thanks to the gimbal mounting.

Other objects and features of novelty, including novel means for supporting the depressor device and also novel modifications in structure thereof, will be apparent from the following specification when read in connection with the accompanying drawings in which one embodiment of the invention is illustrated by way of example.

In the drawings:

FIGURE 1 is a diagrammatic view in side elevation showing the relative positions of two aircraft coupled for refueling, when the trailed hose and attached drogue is of the usual type;

FIGURE 2 is a similar view showing the relative stations of the aircraft when a depressor drogue of the type provided by the present invention is used;

FIGURE 3 is a view in side elevation (partly in section) of the drogue and coupling unit modified by the application of a novel depressor means and embodying the principles of the invention;

FIGURE 4 is a view similar to FIGURE 3 in which the universally mounted depressor means is shown functioning while the drogue and coupling unit has been rotated ninety degrees;

FIGURE 5 is a fragmentary sectional view taken on line 5—5 of FIGURE 3;

FIGURE 6 is a fragmentary sectional view taken on line 6—6 of FIGURE 4;

FIGURE 7 is a view in side elevation (partly in section) of another embodiment of the invention in which a double annulus is employed as the depressor means;

FIGURE 8 is a fragmentary detail view showing the means for connecting the two annuli;

FIGURE 9 is a view generally similar to FIGURES 3 and 7 and illustrating a still further modification of the invention;

FIGURE 10 is a view in rear elevation of the same device, the connecting hose being shown in section;

FIGURE 11 is a diagram illustrating the forces operative upon the trailed device in the case of the last named embodiment, with the depressor means shown in an inoperative upward position; and FIGURE 12 is a similar diagram showing the effect of the sustained forces in maintaining the device in proper operative position.

In the diagrammatic view of FIGURE 1 the leading aircraft 10, which is usually the tanker in a refueling operation, is flying a course indicated approximately by the broken line A, and is trailing a fuel hose 11 to which a combined drogue and coupling member 12 is attached, this member comprising a coupling element 13 and a drogue element 14 and being of any type currently used, such as for example, as illustrated in the United States patent to Cobham et al., No. 2,692,102. The following aircraft 15, which in most instances is the one to be refueled from the tanker 10, is flying only slightly below the line B which indicates the approximate lower limit of down-wash of the leading craft 10. The following craft 15 has made fueling contact with the drogue-and-coupling unit 12 by means of the probe element 16 which carries at its forward end a mating coupling member (not shown) adapted to engage the trailed coupling member 13, after being guided into proper registry therewith by the conical drogue element 14.

Now it is obvious that if both aircraft were of conventional propeller types the following craft 15 would probably suffer no more danger or inconvenience than a certain amount of turbulence from the wake or back-wash of the leading plane 10. However, if the leading aircraft 10 at least is a jet plane, the following plane 15 would be stationed too close to the wake of the leading aircraft for safety, unless the hose 11 were lengthened beyond all practicability.

FIGURE 2 of the drawings illustrates the relative stationing of the tank aircraft 10 with respect to the following aircraft 15 when the drogue-depressor provided by the present invention is employed. It will be noted here that the angle between the hose 11 and the axis of the leading aircraft 10 is considerably greater and the following aircraft 15 is stationed safely below the back-wash of the leading aircraft indicated approximately by the line B. The modified drogue-and-coupling element is indicated generally by the reference numeral 12A and comprises the coupling portion 20, the basic drogue portion 21 and the novel drogue-depressor portion described below.

In the enlarged detail views of the novel drogue-depressor device afforded by FIGURES 3–6 inclusive, the hose 11, coupling member 20, and conical drogue element 21 will be readily recognized, it being understood that the hose is secured to the trailed coupling member 20 as by means of a suitable ball joint suggested at 23.

The novel drogue-depressor element which features one embodiment of the present invention and which is generally indicated by the reference numeral 25, comprises an annular member of generally cylindrical configuration, a cross-section of which, as clearly indicated in FIGURES 3 and 5 of the drawings, is preferably of aerodynamic airfoil configuration having the familiar rounded forward edge 26 and the sharper tapered converging aft edge 27.

The annulus 25 is universally mounted upon the drogue and coupling assembly 12A by means of a gimbal mounting indicated by the reference numeral 30. This mounting comprises a gimbal ring 32 which is pivotally secured at diametrically opposite points 33 and 34 to the brackets 35 projecting from the body portion of the drogue-and-coupling unit 12A. Obviously, within the purview of the invention, the brackets 35 may be secured either to the coupling portion 20, the basic drogue element 21, or between these two members, and the point of attachment in a fore-and-aft direction may be pre-selected in accordance with the individual characteristics of the drogue-and-coupling assembly and of the depressor ring 25. As shown in the detailed drawings, the pivotal connections 33 and 34 may each comprise the headed bolt or pin 40 and an intervening spacing washer 41, a nut 42 being applied to the inner end of the element 40.

At diametrically opposite points on the gimbal ring 32 displaced ninety degrees from the points 33 and 34, forwardly extending arms or struts 45 are pivoted as at 46 and 47. For the purpose of providing these pivotal connections the rear ends of the struts 45 are bifurcated and the divided portions 48 and 49 thereof embrace the ring 32 and are pivotally secured thereto as by means of the pin or bolt 50 to which a nut 51 is applied. A spacing washer 52 may be interposed between at least one of the bifurcations and the ring 32.

The forward ends of the struts 45 are also bifurcated to provide the arms 55 and 56 which embrace the aft portions 27 of the drogue-depressor element 25.

By this mode of attachment, the depressor ring 25 is in effect pivoted about a point adjacent the zone of attachment of the basic drogue element 21 to the coupling member 20 with its freedom of motion about such point restrained only by the engagement of the upper forward portion of the inner surface of the element 25 with the forward portion of the coupling member 20, this point of contact being indicated at 60 in FIGURES 3 and 4 of the drawings. The center of gravity of the depressor ring 25 being located well forward of the point of universal pivoting, there is produced a moment serving to continually deflect the ring downwardly with the leading edge 26 always bearing on the top of the coupling approximately at the point 60. Roll of the drogue-and-coupling element 12A in flight is always compensated by the universal gimbal mounting 30 so that gravitational pull on the depressor ring 25 will always serve to re-locate the ring to bear against the coupling member 20 as at the top point 60 whatever part of the coupling member is uppermost.

Thus the depressor ring 25 always addresses the air flow at a negative angle of attack whether the lower semi-cylindrical portion of the element 25 or the upper semi-cylindrical portion is considered. This produces a depressive force proportional to the size of the ring and the air speed at which it is flown. Of course, because of the gravity moment, this force is always in a downward direction.

In FIGURES 7 and 8 of the drawings, there is shown a trailed device which includes the primary trailed element 120 which in this illustrative embodiment is also a coupling member employed in flight refueling, and a fuel hose 11 is universally attached to this member as by the ball joint 23, as in the cases of the earlier described embodiments.

The gimbal suspension of the annular depressor member 125 in this case is attached to the member 120 adjacent the point where the usual conical drogue 21 is secured and is of substantially the same construction as the one described in connection with the embodiment shown in FIGURES 1–6 of the drawings, and the various parts are designated by the same reference numerals increased by 100. For example, the upper and lower pivot points 133 and 134 are supported by brackets 135 and the gimbal ring 132 is provided with pivots 146 and 147 (the latter not shown) for the attachment of the arms 145 of the depressor means 125. In this embodiment the arms 145 are secured to an inner annular substantially cylindrical element 125b as at 155. At suitable points around the periphery of this inner cylinder the outer and larger cylindrical element 125a is secured as by means of the offset Z-brackets 170.

When in proper position, the forward end of the depressor device is lowered to bring the inner edge of the upper forward portion of the inner ring 125b into contact with an upper portion of the member 120 as at 160.

This device affords considerably more airfoil area addressed to the air stream at a negative angle of attack than in the earlier described embodiment.

In FIGURES 10–12 of the drawings, an embodiment of the invention is illustrated in which the trailed device includes the primary member 220 which can be a coupling device for refueling, together with the usual conical drogue suggested at 21, and a modified depressor member 225 which is secured to the trailed primary element 220 by means of the universal gimbal coupling 230, and at a more forward point on the member 220 than in the cases of the examples earlier presented.

The annular depressor member 225 comprises a single substantially cylindrical ring, and the gimbal assembly 230 is disposed within the confines of the ring rather than being connected to the ring by means of the arms extending in an aft direction. Extending radially inwardly from the cylindrical member 225 at diametrically opposite points are the U-brackets 280 and these are pivotally connected by means of the pintles 246 and 247 to the gimbal ring 232, which ring is pivoted at upper and lower diametrically opposite points to the bracket 281 as at 233 and 234. The bracket 281 is secured to a forward casing portion 282 of the member 220 as by means of the bolts 283. It will thus be seen that the depressor device 225 has a universal mounting with respect to the member 220.

At suitable intervals around the inner periphery of the cylindrical disposed element 225 are the bracket members 284. These members may assume an approximately Z-shaped configuration in transverse section, each having an outer flange 285 secured to the cylinder 225 and an inner stiffening flange 286.

Tapered portions of these brackets 284 extend forwardly beyond the forward edge of the cylinder 225 and are conformed at their outer ends to an arcuate configuration to receive the toroidal annular weighted member 290. The ring 290 may be a hollow metallic tubular member loaded as at 291 with a heavy metal such as lead.

Secured to a rearward inner corner of each of the brackets 284 is a ring 293 which acts as a buffer means adapted to contact the buffer band 295 which surrounds the device 220 at a point aft of the gimbal arrangement.

It will be readily seen that by means of this universal gimbal mounting the depressor device 225 may always maintain a forwardly and downwardly canted position where some point on the ring 293 contacts with the instantaneous lowermost point of the buffer band 295.

The weighted ring 290 extending from the forward portion of the depressor 225 affords assurance that the depressor device will always seek its downward and forwardly inclined operative position regardless of the amount of disturbance or whipping to which it might be subjected during adverse trailing conditions, such as for example, disturbance during coupling operations or immediately after uncoupling, when the trailed member 220 involved is a refueling coupling adapted to be contacted by a mating coupling device carried by a following aircraft.

Referring to FIGURES 11 and 12 it will be seen that any inadvertent up-flinging of the depressor device 225 such as suggested in FIGURE 11 would be immediately counteracted by the sustained forces to be described, and the device would be restored to its proper operative position shown in FIGURE 12. In these diagrams, the point $P_1$ is the approximate center of gravity of the device, the point $P_2$ is the aerodynamic center, and the point $P_3$ represents the mounting point of the depressor.

The drag force is indicated at D, the lift force sustained during the abnormal position of FIGURE 11 is indicated at $L^+$, while the gravitational force of the weighted ring 190 is represented at W. The moment arm of the lift force is shown at $d_1$ and the moment arm of the weight force is indicated at $d_2$. In order to bring the device to the proper operative position shown in FIGURE 12 the following relationship must apply:

$$Wd_2 > L^+d_1$$

With the weight moment overcoming the positive lift moment, the device will be soon restored to the proper position as in FIGURE 12 where the weight and the negative lift are both operating to maintain the attachment 225 in proper position for a negative angle of attack.

It will be seen that by means of the present invention a larger trail angle of the hose can be maintained even at the higher speeds, and this serves to position the drogue-and-coupling assembly 12A at a much lower point with respect to the leading aircraft and enables the following aircraft to engage the coupling well below the wake or back-wash of the leading craft, and at the same time actually approach the following craft closer and thus realize the benefits of a shorter and consequently lighter hose.

The annular depressor elements have been illustrated and described as generally cylindrical, but minor departures from this configuration, such as slightly frustoconical contours, may well come within the purview of the present conception.

It is understood that various other changes and modifications may be made in the embodiments illustrated and described herein without departing from the scope of the invention as defined by the following claims.

Having thus described the invention, what is claimed as new and desired to be secured by Letters Patent is:

1. A device adapted to be trailed from an aircraft at the end of a flexible line in stabilized flight, said device comprising a principal member and means connecting it to such line, and drogue means operatively connected with said member for stabilizing and controlling the trailing flight of said principal member in the air stream; said drogue means including a substantially rigid annular member having substantially cylindrical walls, the axis of said annular member being inclined downwardly in the forward direction and upwardly in the aft direction with respect to the axis of the principal member in such trailed flight to present a negative angle of attack to the air stream and thus depress the trailed member to a point well below the level it would assume without the annular member and trailing at the same air speed.

2. The device as set forth in claim 1 in which the cylindrical walls of said annulus are of aero-dynamic airfoil configuration.

3. A device adapted to be trailed from an aircraft at the end of a flexible line in stabilized flight, said device comprising a principal member and means connecting it to such line, and drogue means operatively connected with said member for stabilizing and controlling the trailing flight of said principal member in the air stream; said drogue means comprising a hollow conical stabilizing drogue member flaring aft from the primary trailed member, and a substantially rigid annular member having substantially cylindrical walls, means securing said annular member to said principal member with the axis of said annular member being inclined downwardly in the forward direction and upwardly in the aft direction with respect to the axis of the principal member in such trailed flight to present a negative angle of attack to the air stream and thus depress the trailed member to a point well below the level it would assume with only the conical drogue member applied thereto.

4. A device adapted to be trailed from an aircraft at the end of a flexible line in stabilized flight, said device comprising a principal member and means connecting it to such line, and drogue means operatively connected with said member for stabilizing and controlling the trailing flight of said principal member in the air stream; said drogue means including a substantially rigid annular member having substantially cylindrical walls, the axis of said annular member being inclined downwardly in the forward direction and upwardly in the aft direction with respect to the axis of the principal member in such trailed flight to present a negative angle of attack to the air stream and thus depress the trailed member to a point well below the level it would assume without the annular member and trailing at the same air speed, and universal mounting means for attaching the annular member to said principal member, at a point aft of the center of gravity of the former member, whereby said annular member may present a negative angle of attack regardless of any rotation of the primary member which may occur during flight.

5. The device as set forth in claim 4 in which said universal mounting comprises a gimbal joint connecting said annular member to said principal member at said point aft of the center of gravity of said annular member, and a stop surface carried by said principal member for abutment by said annular member to delimit its posture with respect to the air stream, under the effect of the force of negative lift upon said annular member.

6. The device as set forth in claim 5 in which said substantially cylindrical annular member is of greater diameter than said primary member, surrounds said primary member, and by virtue of the aft connected universal mounting, rests continually with its upper forward inner edge portion in contact with whatever portion of the primary member is uppermost in any roll position of the trailed device.

7. The device as set forth in claim 5 in which said gimbal joint comprises a gimbal ring pivoted for swinging movement about diametrically opposite pivots on the primary member, two arms extending aft from two diametrically opposite points on said annular member and pivotally connected to said gimbal ring at opposite points spaced respectively ninety degrees from said first named pivots.

8. The device as set forth in claim 5 in which there is provided around an inner edge of said cylindrical member a buffer ring, and said stop surface is afforded by a buffer band surrounding the primary trailing element, the ring and band providing variable points of contact for the cylindrical member regardless of any roll position of the primary element.

9. The device as set forth in claim 4 in which the substantially cylindrical annular member is of greater diameter than said principal member and surrounds said principal member; and wherein, by virtue of the negative lift and said universal mounting, the upper forward inner edge portion of said annular member is continually in contact with whatever portion of the principal member is uppermost, in any roll position of the trailed device.

10. The device as set forth in claim 4 in which the substantially cylindrical annular member is of greater diameter than said principal member and surrounds said principal member; and wherein, by virtue of the negative lift and said universal mounting the lower aft inner edge portion of said annular member is continually in contact with whatever portion of the primary member is lowermost, in any roll position of the trailed device.

11. The device as set forth in claim 4 in which the annular member comprises two concentric radially spaced substantially cylindrical elements, and said universal mounting comprises a gimbal joint connecting the inner one of said cylindrical elements to said primary member at said point aft of the center of gravity of said annular member, said inner cylindrical member adapted to abut a stop surface on the primary member to de-limit the position of the annular member with respect to the air stream under the effect of the force of the negative lift upon said annular member.

12. The device as set forth in claim 11 in which the outer cylindrical element of the annular member is of greater fore-and-aft length than the inner one and consequently of considerably greater surface area.

13. The device as set forth in claim 4 in which a weighted extension is carried by said annular member at its forward portion.

14. The device as set forth in claim 13 in which the universal mounting member is disposed within the fore-and-aft confines of the substantially cylindrical annular member.

15. The device as set forth in claim 4 in which an annular weighted extension is carried by said annular member to project forwardly from its forward edge.

16. The device as set forth in claim 15 in which the universal mounting member comprises a gimbal joint disposed within the fore-and-aft confines of the substantially cylindrical annular member.

17. The device as set forth in claim 4 in which the center of gravity of the annular depressor member is located well forwardly therein, and the aerodynamic center of the annular depressor member lies between the forwardly positioned center of gravity and said point of attachment in the fore-and-aft direction.

18. A device adapted to be trailed from an aircraft at the end of a flexible line in stabilized flight, said device comprising a principal member and means connecting it to such line, and drogue means operatively connected with said member for stabilizing and controlling the trailing flight of said principal member in the air stream; said drogue means comprising a hollow conical stabilizing drogue member flaring aft from the primary trailed member, and an annular member having substantially cylindrical walls, means securing said annular member to said principal member, the axis of said annular member being inclined downwardly in the forward direction and upwardly in the aft direction with respect to the axis of the principal member in such trailed flight to present a negative angle of attack to the air stream and thus depress the trailed member to a point well below the level it would assume with only the conical drogue member applied thereto, and universal mounting means for attaching the annular member to said principal member, whereby it may present a negative angle of attack regardless of any rotation of said primary member which may occur during flight, said universal mounting comprising a gimbal joint connecting said annular member to said primary member at a point aft of said annular member and adjacent the point of connection between the primary member and said conical stabilizing drogue member; said cylindrical annular member being of greater diameter than said primary member, surrounding said primary member, and by virtue of the aft connected universal gimbal mounting resting continually with its upper forward inner edge in contact with whatever portion of the coupling member is uppermost during any condition of roll of the coupling assembly.

19. As an article of manufacture, a depressor-drogue device for attachment to an operative element trailed by means of a flexible line from an aircraft in flight, which device comprises a substantially rigid annular member having substantially cylindrical walls and open at both ends for the passage of airstream therethrough, and means for pivotally connecting said device to said element.

20. As an article of manufacture, a depressor-drogue device for attachment to an element trailed from an aircraft in flight, which comprises a substantially rigid annular open ended member having substantially cylindrical walls of aerodynamic airfoil configuration, and means extending from its aft end for connecting it to said element, said connecting means comprising a universal mounting, whereby the depressor-drogue may continually present a negative angle of attack to the air stream whatever the roll position of the trailed element may be.

21. As an article of manufacture, a depressor-drogue device for attachment to an element trailed from an aircraft in flight, which comprises a substantially rigid annular open ended member having substantially cylindrical walls, and means extending from its aft end for connecting it to said element, said connecting means comprising a universal mounting, whereby the depressor-drogue may continually present a negative angle of attack to the air stream whatever the roll position of the trailed element may be.

22. A depressor-drogue for attachment to an element trailed from an aircraft in flight, which comprises a pair of cylindrical annuli of substantially rigid sheet material, means rigidly connecting said annuli in concentric radially spaced relationship, and a universal mounting device for connecting said depressor-drogue to such an element, whereby the depressor-drogue may continually present its surfaces to the air stream at a negative angle of attack whatever the roll position of the trailed element may be.

23. As an article of manufacture, a depressor-drogue device for attachment to an element trailed from an aircraft in flight, which comprises a substantially rigid annular open ended member having substantially cylindrical walls, a weighted extension projecting from its forward portion, and a universal mounting for supporting the member from the trailed element, said universal mounting being disposed aft of the center of gravity of the depressor-drogue attachment.

24. As an article of manufacture, a depressor-drogue device for attachment to an element trailed from an aircraft in flight, which comprises a substantially rigid annular open ended member having substantially cylindrical walls, a rigid weighted annular extension projecting from its forward edge, and a gimbal joint for supporting the member from the trailed element, said gimbal joint being disposed within the fore-and-aft confines of said annular member and aft of the center of gravity of the depressor-drogue attachment.

25. A depressor-drogue for attachment to an element trailed from an aircraft in flight which comprises a rigid cylinder of sheet material, and means for attaching said cylinder to the trailed element for universal movement relative thereto, a circular series of brackets extending forwardly from said annular member, and an annular weight carried by the ends of said brackets.

26. A depressor-drogue for attachment to an element trailed from an aircraft in flight which comprises a rigid cylinder of sheet material, and means for attaching said cylinder to the trailed element for universal movement relative thereto, a circular series of brackets extending forwardly from said annular member, and a toroidal hollow element carried by the ends of said brackets, and weighting material filling said hollow toroidal member.

27. A device adapted to be trailed from an aircraft at the end of a flexible line in stabilzed flight, said device comprising a principal member and means connecting it to such line, and drogue means operatively connected with said member for stabilizing and controlling the trailing flight of said principal member in the air stream; said drogue means including a substantially rigid annular member having substantially cylindrical walls, the axis of said annular member being inclined downwardly in the forward direction and upwardly in the aft direction with respect to the axis of the principal member in such trailed flight to present a negative angle of attack to the air stream and thus depress the trailed member to a point well below the level it would assume without the depressor member and trailing at the same air speed, said annular member comprising a pair of concentric substantially cylindrical element, and means rigidly connecting said last named elements in radially spaced relationship.

References Cited in the file of this patent

UNITED STATES PATENTS

| | | |
|---|---|---|
| 2,582,609 | Steele | Jan. 15, 1952 |
| 2,692,102 | Cobham | Oct. 19, 1954 |
| 2,823,881 | Patterson | Feb. 18, 1958 |